June 15, 1965 B. H. FOSTER ETAL 3,188,813
ARTICLE AND PROCESS FOR WAVE DAMPING
Filed March 23, 1961 2 Sheets-Sheet 1

INVENTORS
BOUTWELL H. FOSTER
HENRY F. MILLER
BY

ATTORNEY.

June 15, 1965  B. H. FOSTER ETAL  3,188,813
ARTICLE AND PROCESS FOR WAVE DAMPING
Filed March 23, 1961  2 Sheets-Sheet 2
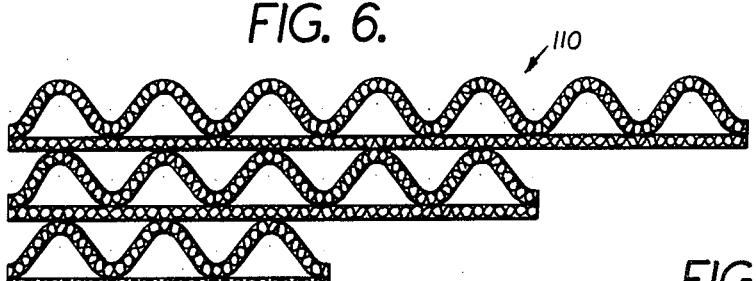
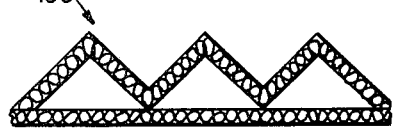
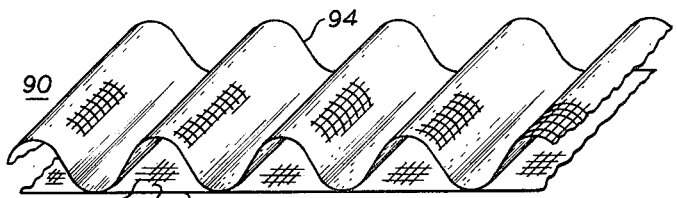
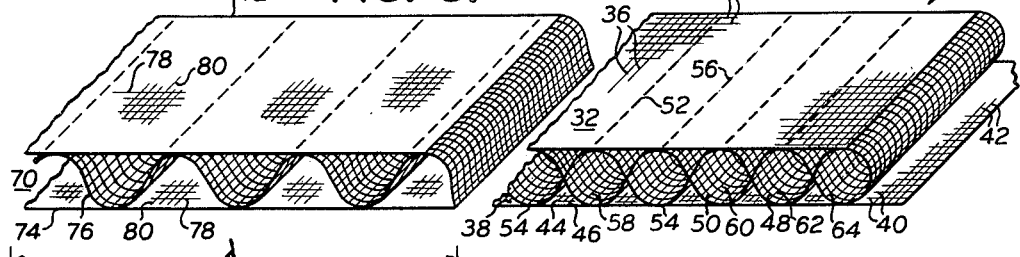
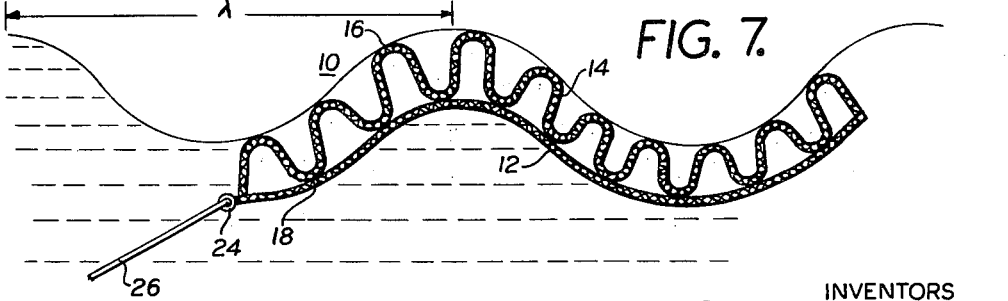
INVENTORS
BOUTWELL H. FOSTER
HENRY F. MILLER
BY
ATTORNEY.

United States Patent Office 3,188,813
Patented June 15, 1965

3,188,813
ARTICLE AND PROCESS FOR WAVE DAMPING
Boutwell H. Foster, Maplewood, and Henry F. Miller, Clifton, N.J., assignors to United States Rubber Company, New York, N.Y., a corporation of New Jersey
Filed Mar. 23, 1961, Ser. No. 97,923
15 Claims. (Cl. 61—5)

This invention relates to a device for the attenuation of waves in liquids, such as waves which occur in the sea, in lakes, or in other large bodies of water, and to a method of attenuating such waves. More particularly, this invention relates to the attenuation of liquid waves by the use of a wave-damping blanket comprising multi-ply sheets of tough, permeable, resilient fabric. The wave-damping blanket comprises a substantially flat multi-ply base sheet and a multi-ply upper sheet of corrugated configuration having peaks and valleys therein, this upper sheet being secured along the valleys thereof to the flat base sheet.

Heretofore numerous attempts have been made to reduce the height and energy of sea waves. Successful damping of waves would offer considerable promise in numerous applications, e.g., reducing the destructive effect of waves in temporary harbors wherein refueling operations must be undertaken, reducing the height of waves in assault operations where beaches need to be protected, or in the open sea where rescue operations must be undertaken, and the like. Similarly, successful wave-damping would facilitate the creation of artificial harbors and shore construction in areas exposed to the open sea, would protect offshore man-made structures such as offshore oil rigs from wave damage, etc.

Accordingly, it is an object of this invention to provide a device for the damping of liquid waves.

Another object is to provide a novel method for the damping of liquid waves.

Additional objects and advantages of this invention will become apparent hereinafter.

The foregoing objects are achieved by the use of a wave-damping blanket of special construction. The wave-damping blanket comprises a substantially flat multi-ply base sheet and a corrugated multi-ply top sheet having peaks and valleys, this sheet secured to the base sheet along the valleys thereof. Both of these sheets are desirably made of a comparatively resilient, tough, permeable, buoyant, multi-ply fabric material.

The method of attenuating waves in accordance with this invention comprises placing the wave-damping blanket in the liquid in which the waves are being propagated with the top-most base sheet disposed beneath the upper corrugated sheet. The inherent buoyancy of the wave-damping blanket is such that the peaks of the top-most corrugated sheet will be at or just beneath the surface of the liquid. As the crest of the incoming wave advances the wave passes through the permeable frontface of the corrugated sheet and the wave impulse is transmitted to the body of liquid within the foremost "compartment" of the blanket, this compartment being defined by the front face, back face, and peak of the foremost corrugation and by the base sheet between the valleys of that corrugation. The wave energy is transmitted to the body of liquid contained in this compartment to thereby induce orbital motion of the liquid. Although the "walls" defining this compartment are permeable and therefore do permit passage of liquid therethrough, these walls also exert a retarding or damping force upon the liquid, tending to break up the orbital motion thereof. In this manner, each successive "compartment" of the wave-damping blanket further damps the wave as it is transmitted therethrough. That is, each "compartment," by virtue of its tough, permeable construction, forms a partial containment for the orbiting mass of water within it, thereby interfering with the orbital motion and gradually damping the wave.

The particular geometry of the blanket is of considerable importance. Specifically, the corrugated permeable blanket of the instant invention permits ready access of the incident waves into the damping compartments and yet exerts great "containment" forces upon the mass of water within the compartment thrown into orbital motion by the wave impulse, so that the wave energy is dissipated. Passage of the waves through successive blanket compartments further dissipates the wave energy, so that when the incident waves are finally transmitted at the "downstream" side of the blanket the wave energy, as evidenced by the wave height of the transmitted wave, is greatly reduced.

For a better understanding of the nature of this invention reference should be had to the following detailed description when read in conjunction with the accompanying drawings, wherein:

FIG. 2 is a perspective view of a four ply fabric used for the upper and base sheets of the device shown in FIG. 1;

FIGS. 3 and 4 are perspective views of a three ply fabric and a two ply fabric, respectively, used as the sheet material in alternative embodiments of this invention;

FIG. 5 is a perspective view of an alternative embodiment of this invention wherein the corrugations are of saw-toothed configuration;

FIG. 6 is a side view of another embodiment of this invention wherein the corrugations of the wave-damping blanket have a saw-toothed configuration; and FIG. 7 is a schematic diagram showing the wave-damping blanket of FIG. 1 in actual operation in a liquid.

Figure 1:
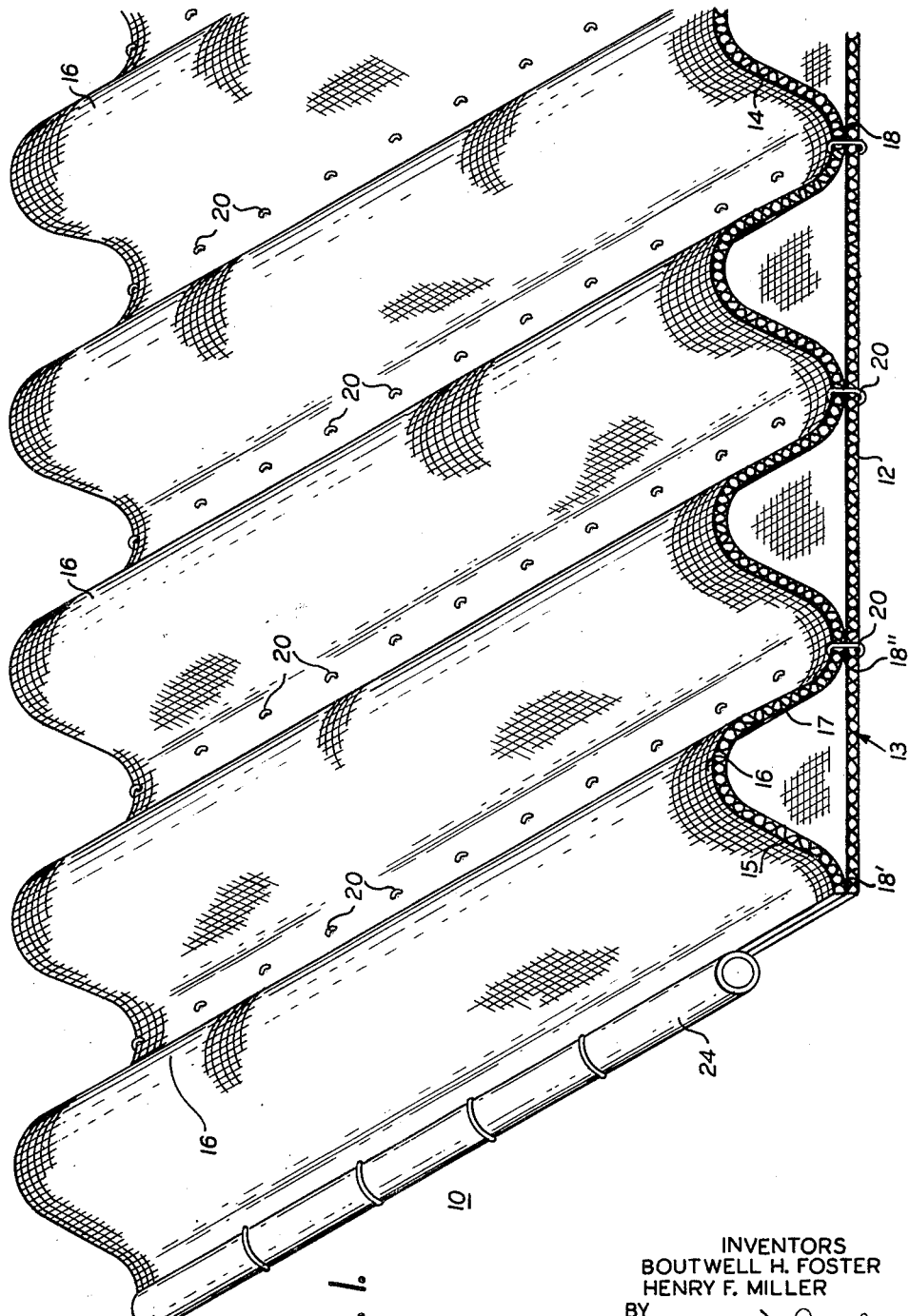
FIG. 1 is a side view in perspective of one embodiment of the wave-damping blanket of this invention wherein the corrugations thereof are of substantially sinusoidal configuration.

The embodiment illustrated in FIGS. 1 and 7 includes a wave-damping blanket generally designated by the figure 10 which is buoyant in the liquid in which the waves are being propagated. The blanket comprises a substantially flat base layer 12 and a corrugated sinuous upper layer 14, containing peaks 16 and valleys 18 therein. The corrugated layer 14 is stiched and lashed to the base layer 12 along the valleys 18 by means of plastic cording 20. The leading edge of the blanket may be stiffened by lashing thereto a metal tube 24. This tube also serves to spread the load of the mooring cable 26 across the entire width of the blanket.

The fabric used in both the upper and base layers of the wave-damping blanket shown in FIG. 1 is shown in perspective in FIG. 2. This fabric is a four-ply fabric, the construction of which is fully described in U.S. application Serial No. 730,399, filed April 23, 1958, by G. D. Martin, now Patent 3,009,232, the contents of which are incorporated herein by reference. Briefly, this fabric, generally designated by the numeral 30, includes a first ply 32 including heat shrinkable synthetic yarns 34 and transverse yarns 36 interlaced therewith. A second ply 38 has heat shrinkable synthetic yarns 40 extending unidirectionally with yarns 34, and transverse yarns 42 interlaced with yarns 40.

Many heat shrinkable synthetic yarns have a relatively high shrinkage, and consequently being suitable for the yarns 34 and 40 are well known in the textile art. Examples of such yarns are: Branched polyethylene, as distinguished from the so-called "linear" polyethylene (an oriented polymerized ethylene); Rhovyl (polyvinylchloride); saran—the so-called high shrinkage type—(a copolymer of vinyl chloride and vinylidene chloride); Verel II (acrylonitrile copolymer), etc. In general the foregoing fibers will shrink 15% or more at temperatures at or below the boil (212° F.) and are eminently suitable for the relatively high shrink yarns. Other high shrink yarns are well known which will shrink an equivalent amount at higher temperatures, e.g., yarns formed of blends of branched and linear polyethylene.

Disposed between plies 32 and 38, are plies 44 and 46, each of which includes yarns which are less shrinkable than the yarns 34 and 40 under the desired shrinking treatment, and which are designated 48 and 50, respectively, and which extend unidirectionally with yarns 34 and 40. Yarns 48 are interlaced first with selected ones of transverse yarns 36, as along lines 52, and alternately with selected ones of transverse yarns 42, as along lines 54. Similarly yarns 50 are interlaced first with selected ones of transverse yarns 36, as along lines 56, which is spaced from line 52, and alternately to selected ones of yarns 42, as along lines 58. It will be noted lines 56 lie between two lines 52 where yarns 48 are joined to the first ply. The manner of joining plies 44 and 46 to ply 38 is the same. Lines 52, 56 and 54, 58 of interlacings, each will comprise one or more transverse yarns 38, 42; for example, two transverse yarns 38 may interlace with yarns 48 at each line 52.

Many yarns which shrink less than the heat shrinkable synthetic yarns 34, 40 at a suitable shrinking treatment are well known to the textile art. For example if the heat shrinking treatment is to be a shrinkage in boiling water, and one of the yarns hereinabove mentioned which shrinks the requisite amount under this treatment is selected for the heat shrinkable synthetic yarns, the following fibers may be used for the less shrinkable yarns 48, 50: nylon, (polyamide); saran—the so-called regular type; Dacron (an oriented polyester of terephthalic acid with ethylene glycol); etc.

Between plies 32, 38, additional transverse yarns 60, 62 interlace only with the less shrinkable yarns 48, 50 respectively. Many yarns are suitable for the transverse yarns 60, 62 and 36 and 40; for example, the less shrinkable fibers noted above are highly satisfactory.

It will be seen that plies 44, 46 intersect each other periodically along lines which have been designated 64 in the drawing. In one embodiment, at the lines 64, yarns 48 alternate with yarns 50 across the width of the fabric, and yarns 48, 50 lie closely adjacent each other, i.e., in abutting relation or spaced less than the diameter of a yarn 48 or 50 from each other along line 64.

The wave-damping blanket illustrated in FIGS. 1 and 7, wherein both the upper and base layers are made of the four-ply material, constitutes a preferred embodiment of this invention, for such four-ply material offers unusual toughness and resilience, yet is extremely permeable.

Other types of multi-ply constructions are also suitable. Two of such constructions are shown in FIGS. 3 and 4. Referring to FIG. 3, a three-ply fabric 70 comprises a top ply 72, a bottom ply 74, and an intermediate ply 76. Desirably both the top and bottom plies each include heat shrinkable synthetic yarns 78 extending unidirectionally of one another, whereas the intermediate ply 76 and the transverse yarns 80 of the top and bottom plies are made of relatively less shrinkable material.

FIG. 4 shows a two-ply fabric 90, comprising a bottom ply 92 and a top ply 94. Desirably the bottom ply includes heat shrinkable synthetic yarns 96 extending lengthwise of the ply, whereas the top ply 94 and the transverse yarns 98 of the bottom ply 92 are made of relatively less shrinkable material.

The nature of both the three-ply and two-ply constructions is more fully described in U.S. Patent No. Re. 24,007 to B. H. Foster, issued May 24, 1955, the contents of which are incorporated herein by reference.

Of course, other multi-ply fabric constructions may be used in the construction of the wave-damping blanket, provided the resulting fabric exhibits the requisite physical characteristics, i.e. permeability, buoyancy in the liquid in which it is suspended, comparative toughness and resiliency, etc. For example, several plies of "plastic screening," i.e., plastic meshed fabric, may be secured to one another to form a strong, buoyant, permeable multi-ply fabric sheet. Two of such sheets can be then used in the construction of the wave-damping blanket, one such sheet as the upper corrugated sheet and the other as the flat base sheet.

Another embodiment of this invention utilizes a wave-damping blanket wherein the upper ply exhibits a saw-toothed corrugation rather than a sinusoidal corrugation. This embodiment is shown in FIG. 5. The saw-toothed blanket 100 functions in essentially the same manner as the sinuous blanket illustrated in FIGS. 1 and 7, the triangular compartments serving as partial containments for the orbiting liquid therewithin.

It is desirable that the overall length of the wave-damping blanket exceed the wave length of the incident waves, i.e., the distance between successive wave crests. If a single blanket assembly unit has a length less than the wave length of the incident wave, several such assemblies may be lashed together to provide the necessary length. The joints between successive blanket assemblies may be stiffened by lashing additional plastic tubing longitudinally of these joints. In general, the thinner the wave-damping blanket, the higher should be the ratio of blanket length to incident wave length. For blankets having a thickness of less than about fifteen percent of the water depth, superior results are achieved where this ratio is at least three.

Increased blanket thicknesses may be readily obtained by plying up individual blanket assemblies and lashing them to one another. The individual assemblies are desirably lashed to one another at close intervals, both at the outside edges and at spaced intervals at the interior. By thus plying up individual blanket assemblies any desired overall thickness may be readily secured. In general, the greater the thickness of the wave-damping blanket, the shorter the overall length required. Of course, the particular degree of wave height attenuation desired to be secured will affect the blanket design. Consequently, where only a slight degree of wave height attenuation is required, the above requirements as to blanket thickness and length may be substantially reduced. In most instances, a wave height attenuation of about 80 percent is more than sufficient, for this represents an energy attenuation of about 96 percent, i.e., the wave energy is proportional to the square of the wave height.

In accordance with another embodiment of this invention, a wave-damping blanket 110 of variable thickness is provided. This "stepped" construction is illustrated in FIG. 6. Maximum blanket thickness is provided at the front portion of the blanket (nearest the incident wave) by plying up several individual blanket assemblies. This increased thickness permits heavy initial damping of the incident wave. As the wave progresses through the increased thickness of the first part of the blanket more wave energy is dissipated than would be the case in a single layer blanket and less blanket thickness is required in succeeding sections of the blanket. Accordingly, the thicknesses are gradually stepped down over the length of the blanket by reducing the number of plied up blanket assemblies, as shown in FIG. 6. Although it is not believed a substantial reduction can be effected in quantity of blanket required to damp a given wave by using the embodiment of FIG. 6, that embodiment, or another multi-layer arrangement, permits a reduction in overall length of the device where that may be necessary or desirable.

The operation of the wave-damping blanket will be described with reference, by way of illustration, to the sinuous wave-damping blanket shown in FIGS. 1 and 7. In order to damp water waves the wave-damping blanket 10 is placed in the body of water in which the waves are being propagated, the natural buoyancy of the blanket being such that the peaks 12 of the top-most sinuous upper layer 14 lie at about the surface of the water. The blanket is moored in position by mooring cable 26, with the trailing edge of the blanket (the righthand edge as seen in FIG. 7) immediately adjacent the area where the calm water is desired. The incident wave approaches the opposite (front) end of the blanket, i.e., containing the tube 24. The crest of this wave passes through the permeable front face 15 of the corrugated sheet 14. The wave energy is thus transmitted to the body of water contained within the foremost compartment of the wave blanket, i.e., that compartment defined by the front face 15, rear face 17, and peak 16 of the corrugated sheet and by that portion 13 of the base sheet 12 between the valleys 18' and 18", thereby inducing orbital motion of the liquid within this compartment. The permeable "walls" 15, 16, 17 and 13 defining this compartment permit passage of water therethrough. However, the flow resistance characteristic of these "walls" tend to disrupt the wave-induced orbital motion of the water thereby dissipating the wave energy and damping the wave. Successive "compartments" in the blanket function in like manner to further damp the wave as it gradually traverses the length of the blanket. Of course, where several blanket assemblies are plied up with one another to provide increased overall blanket thickness, the lower blanket "compartments" also contribute to the damping of the waves.

It will be noted that in the schematic illustration shown in FIG. 7 the blanket length exceeds the wave length λ, i.e., the distance between successive wave crests.

Of course, multi-ply fabrics such as the three-ply and two-ply fabrics shown in FIGS. 3 and 4, respectively, may be used instead of the four-ply fabric shown in FIG. 2 to make up the upper and base sheets of the blanket. Alternatively, several plies of plastic screening may be used, so long as the essential requirements of the final upper and base sheets of the blanket are satisfied, i.e., liquid permeability, resilience, strength, and buoyancy.

Similarly, the saw-toothed corrugation shown in FIG. 6 may be utilized in place of the sinuous corrugation previously described.

In order to construct the wave-damping blanket of the instant invention it is necessary to cause the upper sheet to conform to a corrugated configuration. One convenient method for securing such a configuration is to incorporate one or more draw strings longitudinally of the upper sheet, this sheet also being provided with a plurality of "stops" for the draw strings at spaced positions over the length of the sheet. As the draw string is pulled the sheet is caused to bunch up to form a sinuous corrugated configuration. The height and length of the corrugations is controlled by the placement of the stops and the degree of tightness to which the draw string is drawn. Once the corrugations are formed, the valleys thereof are securely lashed and stitched to the base sheet.

The dimensions of the "compartments" formed by the corrugations of the upper sheet and the base sheet may vary, depending upon the relative toughness, strength, resilience, and shape-retention characteristics of the particular permeable multi-ply fabric material used to make these sheets. Naturally, the height of the corrugations and the distance between adjacent valleys thereof should not be of such proportions that the "compartments" formed thereby substantially lose their shape-retaining capacity when placed in the liquid in which the waves are being propagated. It has been found that particularly good wave-damping is obtained when the corrugation height, i.e., distance from the corrugation peak to the bottom of the base sheet, is from about 4 to 10 inches and correspondingly the distance between adjacent valleys is from about 6 to 12 inches. Of course, constructions falling outside these ranges may also be suitable in certain instances. However, blankets containing "compartments" of smaller size, while operative, tend to be uneconomical.

The following specific examples will further illustrate the invention.

In the preferred embodiment the layers 12 and 14 of the blanket 10 are each made up of the four-ply fabric shown in FIG. 2. The heat-shrinkable synthetic yarns 24, 40 are made up of branched polyethylene. The less shrinkable longitudinal synthetic yarns 48, 50 are made up of polypropylene. The less shrinkable transverse yarns 36, 42 are made up of a blend of branched and linear polyethylene. The yarns have a diameter of from about 0.014 to 0.020 inch. The thickness of the finished four-ply layer of fabric (FIG. 2) is about one half inch. The fabric is inherently slightly buoyant in fresh water. Two such fabric layers are used to form the blanket assembly of FIG. 1, one layer for the base sheet 12 and another from the sinuously corrugated layer 14. The corrugated sheet is stitched and lashed along the valleys to the base sheet with plastic cording. The blanket assembly is about eight inches thick (from the peak to the bottom of the base sheet) and the distance between adjacent valleys is about 12 inches. The tubing is securely lashed to the blanket assembly as shown in FIG. 1. The basic blanket unit is about eight feet four inches long and nine feet wide. These basic units are lashed together to form blanket assemblies having lengths of 16.6, 25, 33.4, and 50 feet. The leading edge of the blanket assembly is additionally stiffened by lashing a metal tube 24 thereto as shown in FIG. 1 to thereby spread the load of the mooring cable 26 across the blanket width.

In certain instances involved multiple layers of the basic blanket unit are used, with the individual layers being securely lashed at close intervals around the outside edges of the stack of blanket units and at spaced intervals in the interior. Mooring stiffeners are provided across the front of the top and bottom layers of these stacked units. Tests are reported for a two-layer blanket of 16 inch total thickness, a three-layer blanket of 24 inch total thickness, and for a stepped blanket which was three layers or 24 inches thick at the front end, two layers or 16 inch thick at the midsection, and one layer or 8 inch thick at the trailing end. In this three-step blanket each thickness has a length of 16.6 feet thus providing a total length of 50 feet.

Test results are tabulated in Table I. The uniformly high degree of wave attenuation is apparent.

TABLE I

| Example No. | No. of Blanket Layers | Blanket Depth (feet) | Blanket Length (feet) | Wave Length (feet) | Incident Wave Height (feet) | Transmitted Wave Height (feet) | Wave Height Attenuation (percent) |
|---|---|---|---|---|---|---|---|
| 1 | 1 | 0.67 | 25 | 5 | 0.21 | 0.001 | 99 |
| 2 | 1 | 0.67 | 33.4 | 10 | 0.62 | 0.06 | 90 |
| 3 | 1 | 0.67 | 50 | 20 | 1.19 | 0.25 | 79 |
| 4 | 2 | 1.33 | 33.4 | 10 | 1.04 | 0.04 | 96 |
| 5 | 2 | 1.33 | 25 | 10 | 0.81 | 0.07 | 92 |
| 6 | 2 | 2.00 | 25 | 20 | 0.89 | 0.18 | 80 |
| 7 | 3 | 2.00 | 50 | 30 | 0.91 | 0.14 | 84 |
| 8 | 3 | 2.00 | 50 | 40 | 0.68 | 0.15 | 77 |
| 9 | Step | 1.33 | 50 | 10 | 0.96 | 0.03 | 97 |
| 10 | Step | 1.33 | 50 | 20 | 1.21 | 0.16 | 87 |
| 11 | Step | 1.33 | 50 | 30 | 0.86 | 0.19 | 77 |
| 12 | Step | 1.33 | 50 | 40 | 0.69 | 0.19 | 75 |

Having thus described the invention, what is desired to be protected and hereby claimed is:

1. A device for damping liquid waves, comprising a flexible, liquid-permeable flat base sheet, an upper, flexible, liquid-permeable sheet of corrugated configuration having peaks and valleys, said upper sheet contacting and being secured along the valleys thereof to said flat base sheet, the distance from the said peaks to the bottom of said base sheet being from about 4 to about 10 inches and the distance between adjacent said valleys being from about 6 to about 12 inches, both of said sheets being made of a buoyant, multi-ply, flexible, liquid-permeable fabric including a corrugated fabric ply, and both of said sheets being equal in length at least to the wave length of the wave to be attenuated, stiffening means for an edge of the fabric secured to the device along one edge thereof, and means attached thereto to moor the device in a body of liquid.

2. The device of claim 1 wherein each multi-ply fabric sheet comprises a substantially planar first and second ply, an undulated third and fourth ply having peaks and valleys therein, said third and fourth plies being disposed between said first and second plies and spacing said first and second plies from one another.

3. The device of claim 1 wherein each multi-ply fabric sheet comprises a substantially planar first and second ply, and undulated third and fourth plies having peaks and valleys therein, said third and fourth plies being disposed between said first and second plies and spacing said first and second plies from one another, the peaks and valleys of said third undulated ply being disposed opposite the valleys and peaks, respectively, of said fourth undulated ply.

4. The device of claim 1 wherein each multi-ply fabric sheet comprises a first and second ply, each ply including heat shrunk synthetic yarns and transverse yarns interlaced therewith, the heat shrunk synthetic yarns in the first ply extending unidirectionally with the heat shrunk synthetic yarns in the second ply, a third and fourth ply, each of said third and fourth plies being undulated and disposed between said first and second plies with the undulated yarns in said plies extending unidirectionally with said heat shrunk synthetic yarns, each of said undulated plies being interlaced periodically and alternately with said first and second plies to tie said four plies into a unitary fabric, said heat shrunk synthetic yarns maintaining said undulated yarns in an undulating state, the undulations in said yarns spacing said first and second plies from one another.

5. The wave damping device of claim 4 wherein said heat shrunk yarns comprise branched polyethylene and said undulated yarns comprise a linear polyolefin.

6. The wave damping device of claim 1 wherein a plurality of upper sheets and base sheets are secured to one another.

7. The wave damping device of claim 1 wherein said upper and base multi-ply fabrics each comprise a substantially planar first and second ply and an undulated third ply disposed therebetween, the undulations in said third ply spacing said first and second plies from one another.

8. The wave damping device of claim 1 wherein said upper and base multi-ply fabrics each comprise a first and second ply, each ply including heat shrunk synthetic yarns and transverse yarns interlaced therewith, the heat shrunk synthetic yarns in the first ply extending unidirectionally with the heat shrunk synthetic yarns in the second ply, a third undulated ply disposed between said first and second plies with the undulated yarns in said ply extending unidirectionally with said heat shrunk synthetic yarns, said undulated ply being interlaced periodically and alternately with said first and second plies to tie said three plies into a unitary fabric, said heat shrunk synthetic yarns maintaining said undulated yarns in an undulating state, the undulations in said yarns spacing said first and second plies from one another.

9. The wave damping device of claim 1 wherein said upper and base multi-ply fabrics each comprise a substantially planar first ply and an undulated second ply disposed along one side of and periodically interlaced with said first ply.

10. The wave damping device of claim 1 wherein said upper and base multi-ply fabrics each comprise a first ply, which ply includes heat shrunk synthetic yarns and transverse yarns interlaced therewith, a second undulated ply disposed along one side of said first ply with the undulated yarns in said ply extending unidirectionally with said heat shrunk synthetic yarns, each of said undulated plies being interlaced periodically with said first ply to tie said two plies into a unitary fabric, said heat shrunk synthetic yarns maintaining said undulated yarns in an undulated state so that the peaks of said undulated yarns are disposed in parallel spaced relation from said first ply.

11. The wave damping device of claim 1 wherein each of said multi-ply sheets comprises a plurality of plastic mesh screens secured to one another.

12. The wave damping device of claim 1 wherein said corrugated sheet is substantially sinusoidal in nature.

13. The wave damping device of claim 1 wherein said corrugated sheet is substantially saw-toothed in nature.

14. A method of damping liquid waves which comprises floating in the liquid in which the waves are formed the wave-damping device as defined by claim 1 with the base sheet of said device disposed beneath the upper sheet and the thickness of the device being at least 15% of the overall depth of the liquid in which it is suspended, mooring the device in such liquid, permitting the wave impulse to enter the space compartment between the base sheet and the foremost corrugation of the upper sheet, the wave impulse entering said space compartment by passing through the permeable front face of the corrugated sheet and transmitting its wave energy to the liquid within the compartment to thereby impart orbital motion thereto, and damping the wave by permitting the permeable space compartment to partially contain the liquid therewithin and to interfere with the orbital motion of said liquid, successive damping being permitted to occur by the gradual passage of the wave impulse through successive space compartments of the wave-damping device.

15. The method of claim 14 wherein a device having a length at least three times the distance between successive wave crests of the liquid wave is so floated.

References Cited by the Examiner

UNITED STATES PATENTS

| | | | |
|---|---|---|---|
| 2,327,184 | 8/45 | Goodlow. | |
| 2,464,154 | 3/49 | Roselius. | |
| 2,607,104 | 8/52 | Foster | 28—72 |
| 2,644,777 | 7/53 | Havens | 154—45.9 |
| 3,009,232 | 11/61 | Martin | 28—72 |
| 3,029,606 | 4/62 | Olsen | 61—5 |

FOREIGN PATENTS 590  1/86  Great Britain.

EARL J. WITMER, *Primary Examiner.*
JACOB L. NACKENOFF, JACOB SHAPIRO,
*Examiners.*